(12) United States Patent
Peters

(10) Patent No.: US 6,764,204 B1
(45) Date of Patent: Jul. 20, 2004

(54) ADJUSTABLE HEAT LAMP APPARATUS

(75) Inventor: Douglas C Peters, Oskaloosa, IA (US)

(73) Assignee: IMEXCO, Inc., Oskaloosa, IA (US)

( * ) Notice: Subject to any disclaimer, the term of this patent is extended or adjusted under 35 U.S.C. 154(b) by 53 days.

(21) Appl. No.: 10/064,163

(22) Filed: Jun. 17, 2002

(51) Int. Cl.[7] .............................. F21V 14/02; F21V 21/00
(52) U.S. Cl. ........................ 362/429; 362/285; 362/407
(58) Field of Search ................................ 362/285, 319, 362/361, 407, 429, 435, 439, 443, 449, 804, 6, 437, 418

(56) References Cited

U.S. PATENT DOCUMENTS

| | | | | |
|---|---|---|---|---|
| 1,309,051 A | * | 7/1919 | Willman | 362/429 |
| 1,479,069 A | * | 1/1924 | Hance | 362/429 |
| 1,849,966 A | * | 3/1932 | Ureles | 248/343 |
| 1,880,952 A | * | 10/1932 | Fabrey | 362/429 |
| 1,972,056 A | * | 8/1934 | Saaf | 362/429 |
| 6,234,653 B1 | * | 5/2001 | Karton | 362/408 |

* cited by examiner

Primary Examiner—Y. My Quach-Lee
Assistant Examiner—Peggy A. Neils
(74) Attorney, Agent, or Firm—Strum & Fix LLP

(57) ABSTRACT

A heat lamp apparatus having a shade adapted to be hung from a place above the shade has an opening disposed therein and through a top portion of the shade. The shade opening has at least one projection extending into the opening in the shade. A heat lamp socket is provided for receiving a heat lamp at one end thereof. The socket has an electrical cord connected to it. An adjusting member has a passageway therein and the electrical cord is disposed in at least a portion of the passageway. The adjusting members has at least one elongated slot extending along one side thereof for selectively receiving the projection of the shade in longitudinally different positions of the slot. A plurality of laterally grooves are disposed to one side of the slot whereby relative rotation of the adjusting member with respect to the shade permits the projection to extend into any one of the plurality of lateral grooves, whereby removing the projection from one of the lateral grooves to another, changes the vertical position of the socket with respect to the shade. Consequently the shade can remain in one position and the adjusting member is used to raise or lower the heat lamp bulb with respect to the shade thereby varying the distance of the heat lamp from the object to be heated and also varying the pattern of the heat.

9 Claims, 8 Drawing Sheets

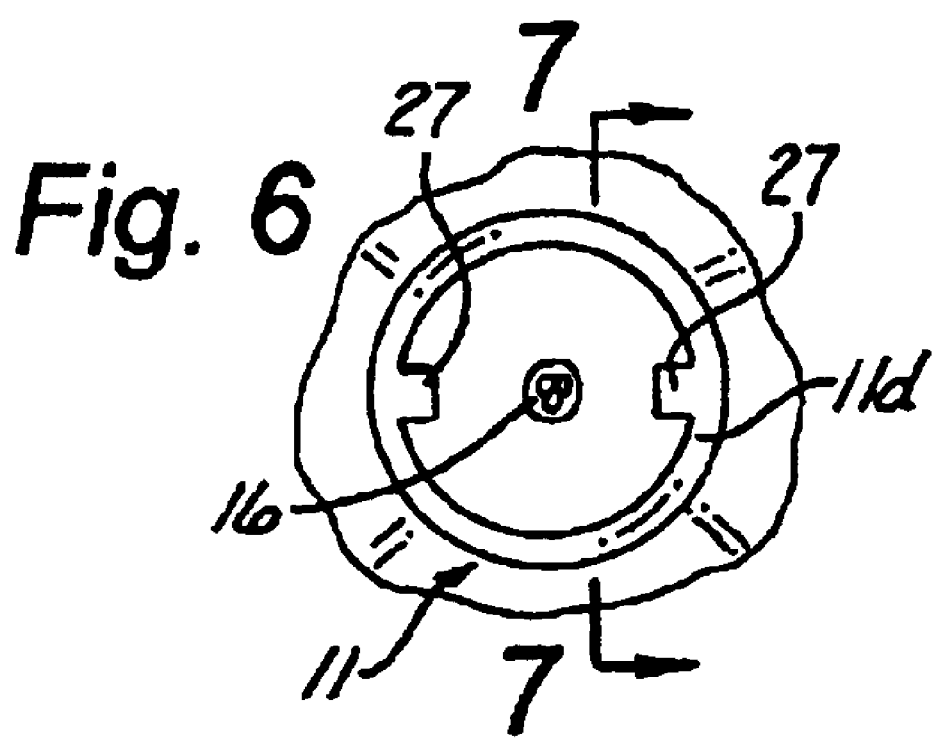

US 6,764,204 B1

ADJUSTABLE HEAT LAMP APPARATUS

CROSS REFERENCE TO RELATED APPLICATIONS

The present application is the utility application version of co-pending Design patent application Ser. No. 29/160,508, filed in the United States Patent and Trademark Office on May 13, 2002, and entitled "Hood For A Heat Lamp Fixture."

BACKGROUND OF INVENTION

1. Field of the Invention

This invention relates generally to heat lamps, and more particularly to an adjustable heat lamp.

2. Description of the Related Art

Heat lamps are used on farms to keep young poultry or young pigs warm. Of course heat lamps have other uses. In most uses of heat lamps, there is from time to time the need to adjust the amount of heat delivered. This is commonly done by merely raising or lowering the heat lamp, along with the shade in which the heat lamp is disposed. For example, a chain or wire holding up a heat lamp shade can be lengthened or shortened in order to move the heat lamp up or down.

This need to lengthen or shorten a cable, wire, chain or the like which is suspending a heat lamp and shade from above is not a convenient way to adjust the heat delivered to its destination. In fact, ladders and tools in the creep area of a farrowing house can pose a safety hazard. Furthermore, this raising and lowering of the heat lamp with the shade does not change the basic heat pattern, but only increases the heat if the heat lamp is closer to the point to be heated or farther from such point.

Consequently there is a need for a more convenient way to adjust the amount of heat delivered to its ultimate destination.

SUMMARY OF INVENTION

The present invention relates to a heat lamp apparatus having a shade adapted to be hung from a place above the shade. An opening is disposed in and through a top portion of the shade and has at least one projection extending into the opening in the shade. A heat lamp socket is provided for receiving a heat lamp at one end thereof. The socket has an electrical cord connected to it.

An adjusting member has a passageway therein and the electrical cord is disposed in at least a portion of the passageway. The adjusting member has at least one elongated slot extending along one side thereof for selectively receiving the projection of the shade in longitudinally different positions of the slot. A plurality of laterally grooves are disposed to one side of the slot whereby relative rotation of the adjusting member with respect to the shade permits the projection to extend into any one of the plurality of lateral grooves, whereby removing the projection from one of the lateral grooves to another changes the vertical position of the socket with respect to the shade. Consequently the shade can remain in one position and the adjusting member is used to raise or lower the heat lamp bulb with respect to the shade thereby varying the distance of the heat lamp from the object to be heated and also varying the pattern of the heat. If the bulb is raised within the shade, the pattern becomes smaller and if the bulb is lowered within the shade, the heat pattern becomes larger.

An object of the present invention is to provide a better way to adjust the heat delivery of a heat lamp.

Other objects, advantages, and novel features of the present invention will become apparent from the following detailed description of the invention when considered in conjunction with the accompanying drawings.

BRIEF DESCRIPTION OF DRAWINGS

FIG. 6 is a top view taken along line 6—6 of FIG. 3 and shows projections in the top opening of the shade.

DETAILED DESCRIPTION

Figure 1:
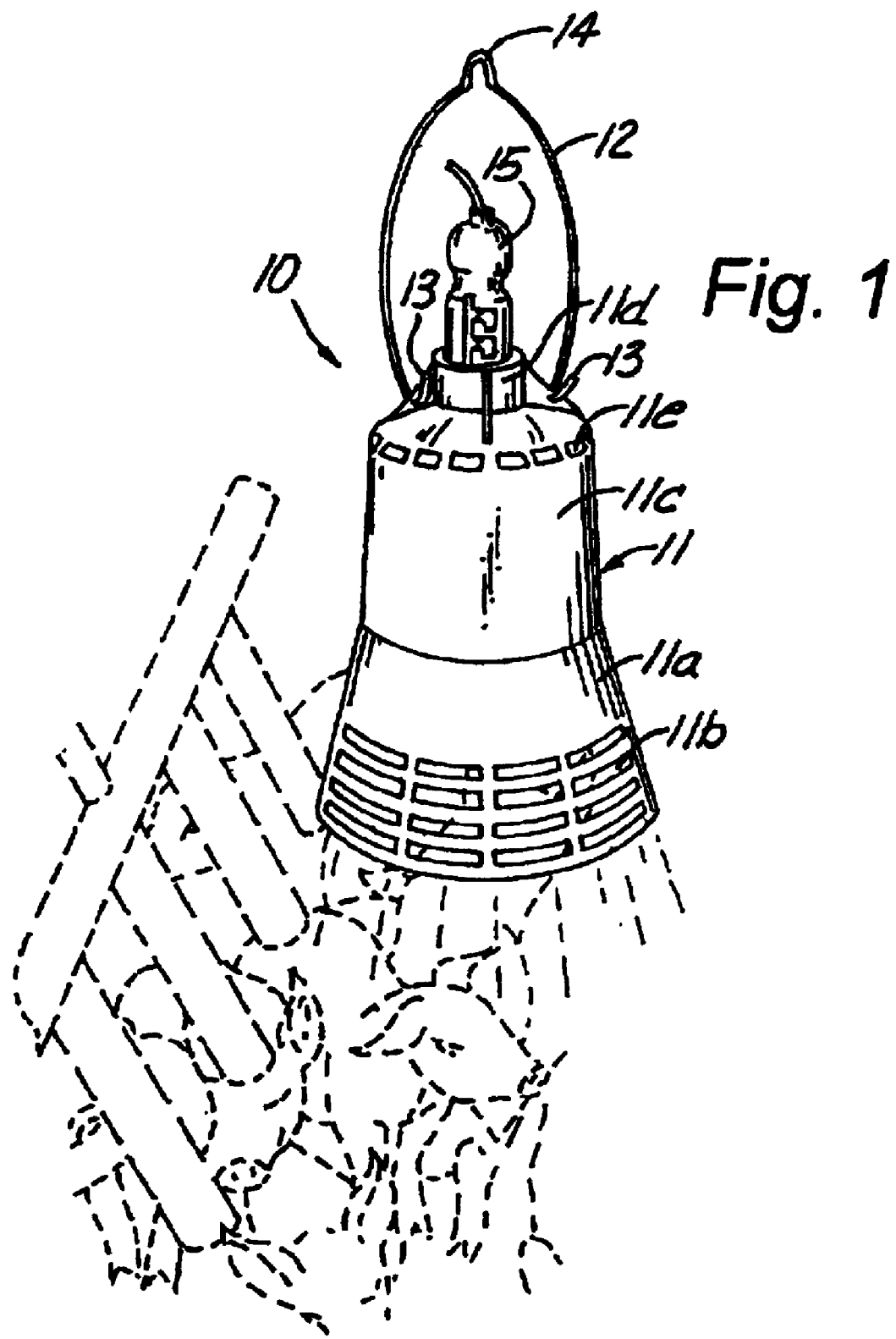
FIG. 1 is a perspective view of a preferred embodiment of the present invention shown in use in a farrowing house where newborn pigs can be seen in dashed lines.
Figure 2:
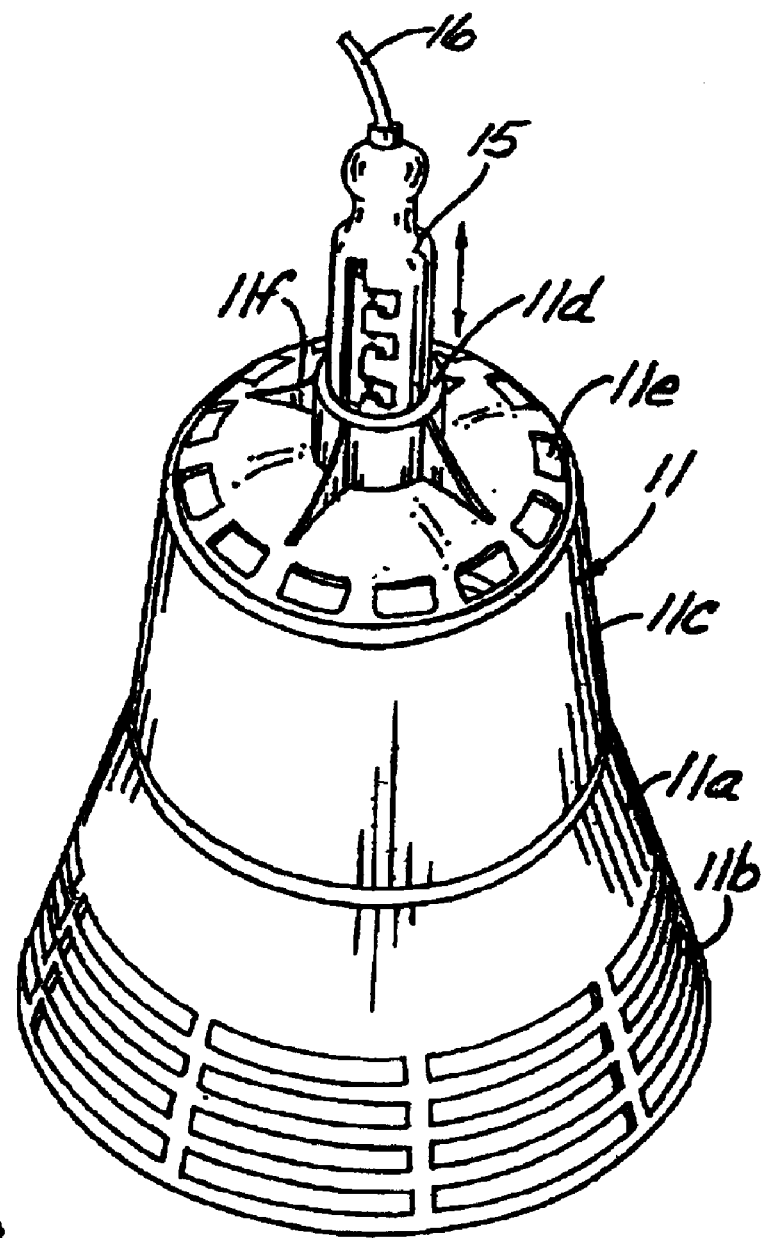
FIG. 2 is another perspective view of the present invention showing how an adjusting member can be moved up or down with respect to a shade.

Referring now to the drawings, wherein like reference numerals designate identical or corresponding parts throughout the several views, FIG. 1 shows a heat lamp apparatus (10) constructed in accordance with the present invention. The heat lamp apparatus (10) has a shade (11) which is preferably molded of high impact polypropylene.

This shade (11) has a lower portion (11a) with openings (11b) therein. The openings (11b) provide another pathway for distributing and disbursing heat e.g. to keep the heat off of a sow in a farrowing pen. The shade (11) also has an intermediate portion (11c) and an upper portion (11d). Openings (11e) are disposed between the intermediate portion (11c) and the upper portion (11d). Portion (11d) includes flanges (11f) and wherein two of the flanges (11f) have openings (11g) therein for accepting a bale (12) with hooks (13) on the bottom thereof which extend through openings (11g) in flanges (11f). An upper part (14) of the bale is adapted to receive a tether such as a wire, rope, chain, cable or the like so that it can be suspended from a place above the apparatus (10).

Figure 3:
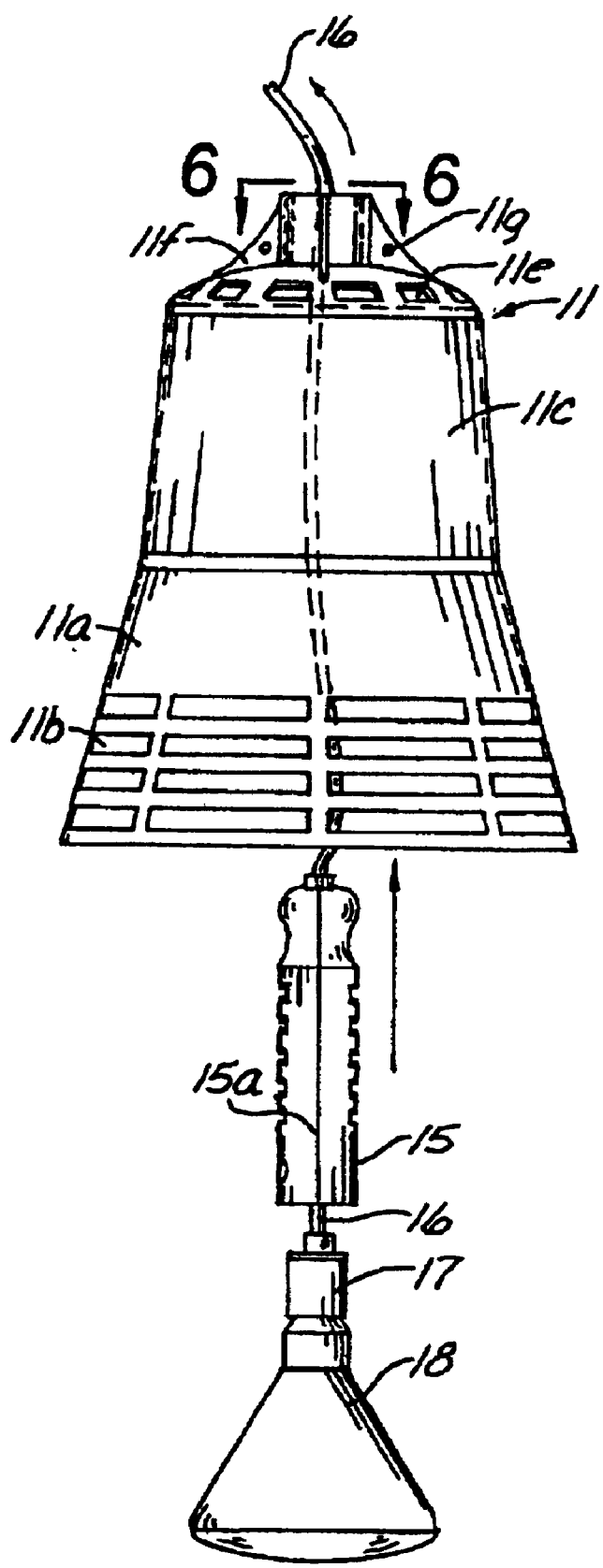
FIG. 3 is a side elevational view showing a heat lamp, socket and adjusting member as it is moved into place into the shade of the present invention.
Figure 4:
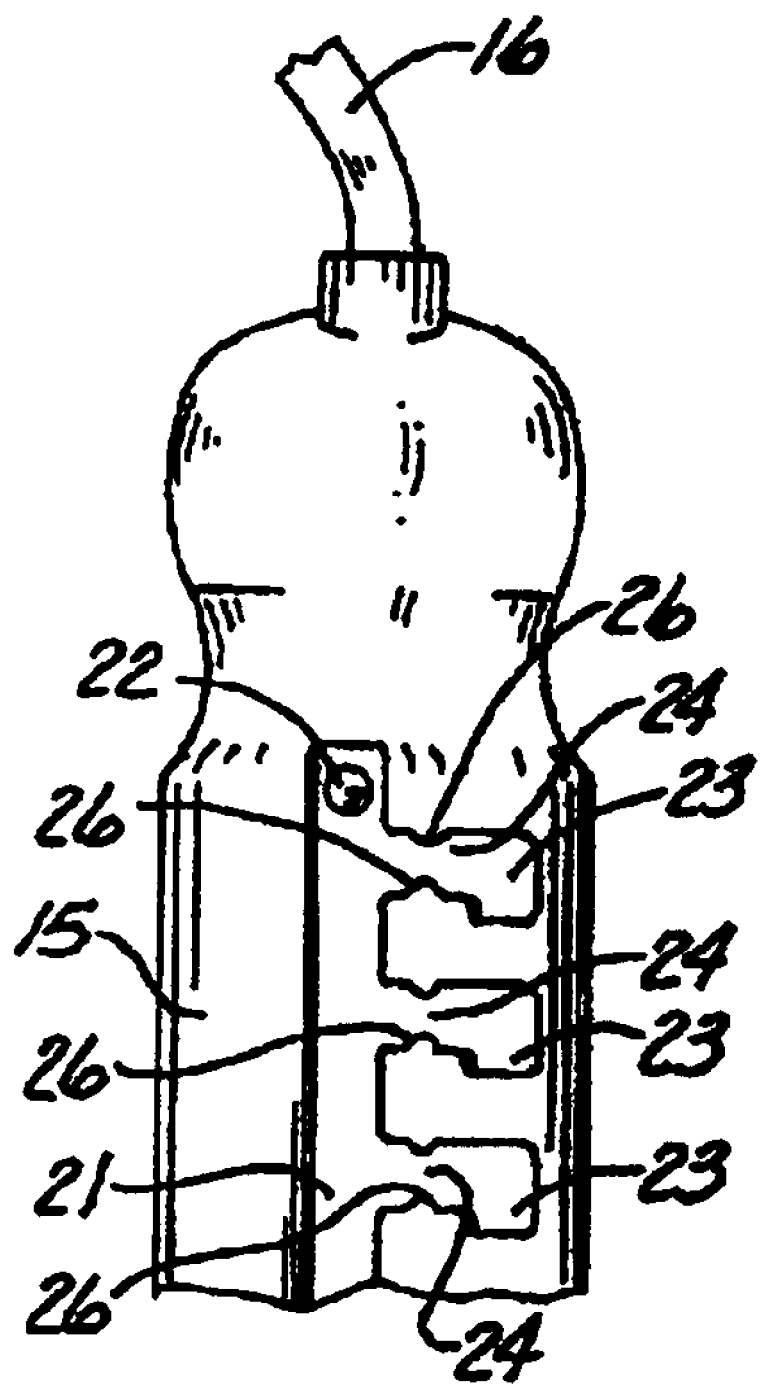
FIG. 4 is an enlarged partial side elevational view of the adjusting member of the present invention.

Referring now to FIG. 3, an adjusting member (15) is shown which is constructed in a right half and a left half which halves are held together by threaded fasteners (not shown). The line (15a)) shown in FIGS. 3 and 5B is the dividing line between the two halves of the adjusting member 15. This adjusting member (15) has a passageway therethrough for receiving an electrical cord (16). The electrical cord (16) is attached to a socket (17) for receiving a heat lamp (18) in a conventional fashion, so that the heat lamp (18) can be screwed into or out from the socket (17) as needed.

The adjusting member (15) is preferably constructed of an industrial grade nylon. The adjusting member (15) has a slot (21) in each side thereof. This slot (21) includes a protuberance (22) at the top thereof for reasons with will be explained below. A plurality of lateral grooves (23) are disposed adjacent to and connecting to the slot (21) and have a restricted portion (24) caused by nodes (26).

Figure 7:
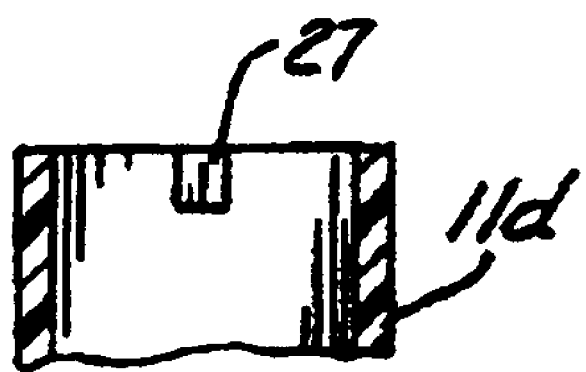
FIG. 7 is a cross sectional view taken along lines 7—7 of FIG. 6 and shows one of the projections in the top opening of the shade.

Referring now to FIGS. 6 and 7, it can be seen that a pair of projections (27) extend inwardly from the upper portion (11d) of shade (11).

Figure 5A:
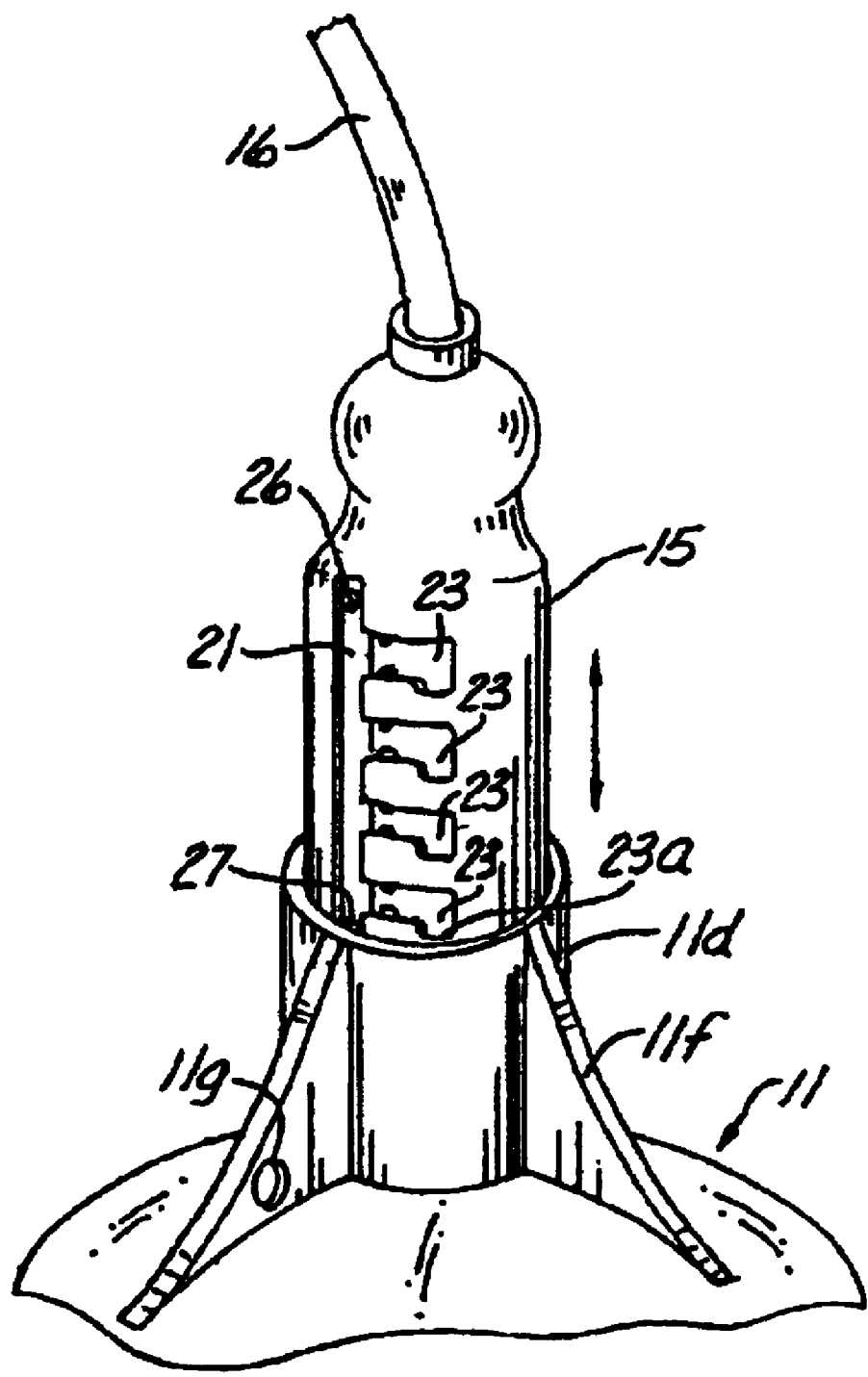
FIG. 5A is an enlarged partial perspective view showing how the adjusting mechanism can be moved up and down with respect to the shade.
Figure 5B:
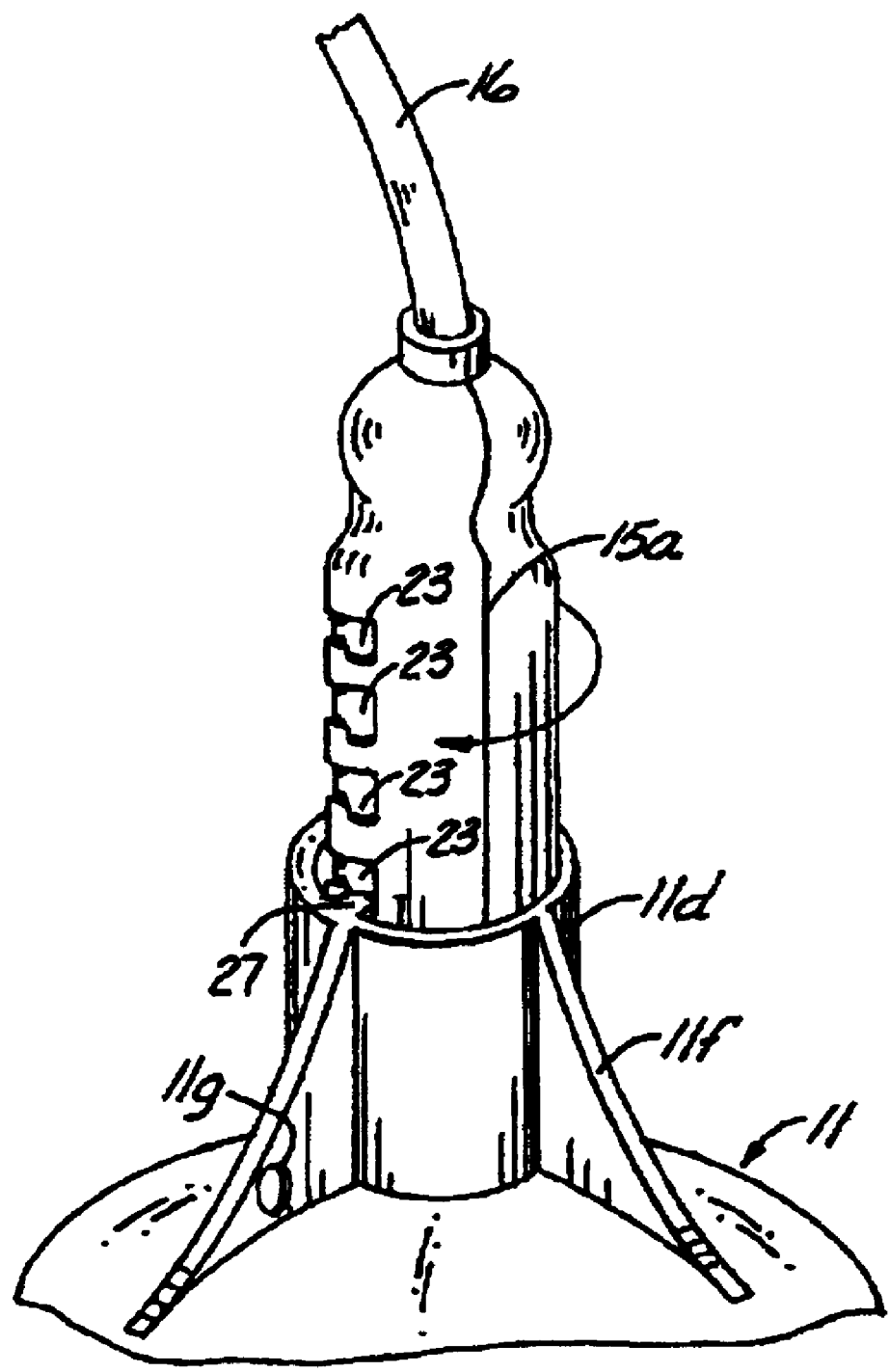
FIG. 5B shows how the adjusting mechanism can be rotated with respect to the shade so that it can be held in a desired vertical position with respect to the shade.

Referring now to FIG. 3, it can be seen that as the adjusting member (15) is pulled upwardly by use of the cord (16), the projections (27) will first contact the protuberances (26) at the top of slots (21) and the resilience of either or both of projections (27) and protuberances (26) will allow the adjusting member (15) to move to the position shown in FIG. 5A from the position shown in FIG. 3. If at that point, the adjusting member is released, it would fall downwardly until the protuberance (26) hits a projection (27), at which time it would stop and thereby prevent the bulb (18) from continuing downwardly and possibly being damaged by something, below such as a floor.

To secure the bulb (18) at the desired position with respect to the shade (11), the adjusting member (15) is rotated as shown in FIG. 5B to whichever lateral groove (23) is desired. By releasing the adjusting member (15), the shade will be in the position shown in FIG. 5B wherein the slot (27) moves down into a bottom portion (23a) of slot (23). This depression (23a) tends to keep the shade from rotating out of the lateral slot (23). Additionally, the nodes (26), causing the restriction (24) in lateral groove (23), also prevent the adjusting member to remain in the position shown at FIG. 5B until and unless the adjusting member (15) is rotated the opposite position shown in FIG. 5B. This will force the projections (27) past the nodes (26). The height of the projection (27) is bigger than the height of restriction (24) between adjacent nodes (26). Consequently, either or both of the projections (27) and nodes (26) must be deformable to some extent to permit such rotation and to allow the projection (27) to move back from the position shown in FIG. 5D into the slot (21) as shown in FIG. 5A.

Once adjusting member (15) has been moved so that the projections (27) are in the slot (21), the adjusting member (15) can be moved up or down to position the projection (27) in a desired one of the lateral grooves (23). Of course if the projection (27) is in the top lateral groove (23), that would mean that the heat lamp (18) shown in FIG. 3 is moved downwardly from the position that the heat lamp would be in the FIG. 5 position. It will be understood of course that any one of the lateral grooves (23) can be utilized by placing projections (27) therein to adjust the height of the heat lamp (18) with respect to the shade (11).

It can therefore be seen that by utilizing the adjusting member (15) with respect to the shade (11) that not only can the bulb (18) be moved closer to or further from an object to be heated, but since the heat lamp (18) can be moved up or down within the shade (11), the pattern of the heat is also adjusted. When the heat lamp is lowered, the circular pattern of heat projected on the floor below will be larger, and as the heat lamp (18) is adjusted upwardly with respect to the shade (11), the circular pattern on the floor below the heat lamp apparatus will become smaller.

Accordingly, it will be appreciated that the preferred embodiment shown herein does indeed accomplish the aforementioned object. Obviously many modifications and variations of the present invention are possible in light of the above teachings. It is therefore to be understood that, within the scope of the appended claims, the invention may be practice otherwise than as specifically described.

What is claimed is:

1. A heat lamp apparatus comprising:

a shade adapted to be hung from a place above the shade;

an opening being disposed in and through a top portion of said shade;

a projection extending into said opening in the shade;

a heat lamp socket for receiving a heat lamp bulb in one end thereof, said socket having an electrical cord connected to the other end thereof;

an adjusting member having a passageway therein and having said electrical cord being disposed in at least a portion of said passageway;

said adjusting member having an elongated slot extending along at least one side thereof for selectively receiving said projection in longitudinally different portions of said slot;

a plurality of lateral grooves being disposed to at least one side of said slot whereby relative rotation of the adjusting member with respect to the shade permits said projection to extend entirely into any one of said plurality of lateral grooves whereby removing said projection from one of said lateral grooves to another changes the vertical position of the socket with respect to the shade.

2. The heat lamp apparatus of claim 1 wherein said slot is substantially vertical in use.

3. The heat lamp apparatus of claim 1 wherein said lateral grooves include a downwardly extending portion spaced from the slot for permitting said projection to drop into the slot due to weight of the shade.

4. The heat lamp apparatus of claim 1 wherein said adjusting member is made of a resilient material and a restricted portion of each of said lateral grooves between the slot and the downwardly extending portion of the groove is smaller than that portion of a projection passing from the slot to the downwardly extending portion of the groove thereby substantially preventing the projection from inadvertently passing through said restricted portion.

5. The heat lamp apparatus of claim 4 including a protuberance on the adjusting member at the top of the slot to prevent the adjusting member from falling out of the shade when the adjusting member is in the slot and not in one of the lateral grooves.

6. The heat lamp apparatus of claim 4 including a second slot and second set of lateral grooves in said adjusting member for cooperation with a second projection extending into said opening in the shade.

7. The heat lamp apparatus of claim 6 including a protuberance in said second slot for preventing the adjusting member from falling out of the shade when the adjusting member is in the slot and not in one of the second set of lateral grooves.

8. The heat lamp apparatus of claim 1 including means for attaching said shade to said point above said shade.

9. The heat lamp apparatus of claim 8 wherein said attaching means comprises at least a wire bale attached at each end thereof to the top of the shade, said wire bale being adapted to be attached to a line, wire or chain attached to said place above the shade.

* * * * *